(12) United States Patent
Marsack

(10) Patent No.: US 10,300,772 B1
(45) Date of Patent: May 28, 2019

(54) MULTI-USE VEHICLE DOOR AND NET COUPLING SYSTEM FOR ONE MOTION OPERATION

(71) Applicant: HONDA MOTOR CO., LTD., Tokyo (JP)

(72) Inventor: Dane R. Marsack, West Liberty, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 13 days.

(21) Appl. No.: 15/864,503

(22) Filed: Jan. 8, 2018

(51) Int. Cl.
*B60R 21/13* (2006.01)
*B60J 5/04* (2006.01)
*E05B 79/20* (2014.01)
*E05B 83/36* (2014.01)

(52) U.S. Cl.
CPC .......... *B60J 5/0487* (2013.01); *B60J 5/0468* (2013.01); *B60R 21/13* (2013.01); *E05B 79/20* (2013.01); *E05B 83/36* (2013.01); *B60R 2021/137* (2013.01)

(58) Field of Classification Search
CPC ....... B60J 5/0487; B60J 5/0468; E05B 79/20; B60R 2021/137; B60R 21/13
USPC ...................................................... 296/146.1
See application file for complete search history.

(56) References Cited

U.S. PATENT DOCUMENTS

| | | | | |
|---|---|---|---|---|
| 5,290,086 | A * | 3/1994 | Tucker | B60R 21/06 280/749 |
| 6,135,497 | A * | 10/2000 | Sutherland | B60R 21/08 280/748 |
| 6,773,054 | B2 * | 8/2004 | Martini | B60J 5/0487 296/148 |
| 8,123,279 | B2 * | 2/2012 | Orr | B60J 5/0487 296/148 |
| 8,328,235 | B2 | 12/2012 | Schneider et al. | |
| 8,465,050 | B1 * | 6/2013 | Spindler | B60R 21/06 280/749 |
| 9,073,412 | B2 | 7/2015 | Dobrot et al. | |
| 9,475,367 | B1 * | 10/2016 | Wilson, III | B60J 5/0487 |
| 9,718,427 | B2 | 8/2017 | Szewczyk et al. | |
| 2003/0111863 | A1 | 6/2003 | Weyerstall et al. | |

* cited by examiner

*Primary Examiner* — Pinel E Romain
(74) *Attorney, Agent, or Firm* — Arent Fox LLP

(57) ABSTRACT

The disclosure provides a door system for a vehicle having a roll cage. For example, the vehicle may be a multi-use vehicle. The door system may include a door hinged to a vehicle body and releasably engaged to the vehicle body in a closed position by a latch. The door system may include a net extending from the door to the roll cage. The net may be releasably attached to the roll cage by a clip actuatable by a cable connected to the latch.

20 Claims, 4 Drawing Sheets

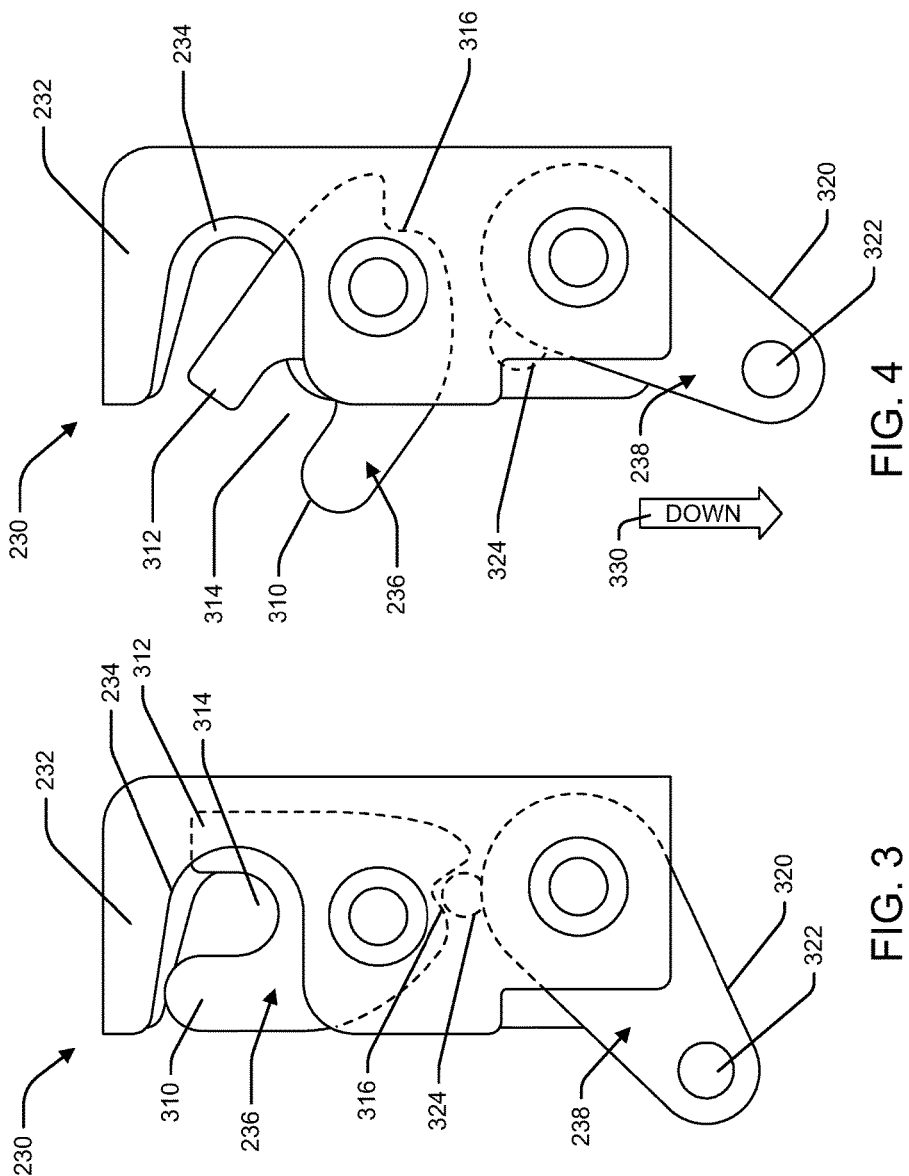

MULTI-USE VEHICLE DOOR AND NET COUPLING SYSTEM FOR ONE MOTION OPERATION

TECHNICAL FIELD

Aspects of the present disclosure relate to systems, devices and methods of operating thereof in automotive assembly, and in particular to systems, devices and methods of operating thereof for multi-part doors including a net portion.

BACKGROUND

A multi-use utility vehicle (MUV) typically includes a roll cage that provides stability to the vehicle and protection to the driver and passenger(s). The roll cage may also be referred to as roll-over protection (ROP) or an occupant protection structure (OPS). The roll cage typically extends above a body portion of the MUV.

Some MUV models include a door that closes the body portion of the MUV and netting affixed to the roll cage that extends above the body portion. The netting, for example, may provide protection against small rocks, branches, and pieces of debris entering the passenger area of the MUV while providing ventilation and outward visibility. The netting may also prevent the hands and arms of a driver or passenger from leaving the passenger area of the MUV while in motion. The combination of a door and netting, however, may present difficulties for a driver or passenger in entering or leaving the MUV.

In view of the foregoing, there is a need for improved door systems for multi-part doors including netting and techniques for manufacturing such doors. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides a door system for a vehicle having a roll cage. The door system may include a door hinged to a vehicle body and releasably engaged to the vehicle body in a closed position by a latch. The door system may include a net extending above the door to the roll cage, wherein the net is releasably attached to the roll cage by a clip actuatable by a cable connected to the latch.

In another aspect, the disclosure provides a vehicle. The vehicle may include a vehicle body including a seating area. The vehicle may include a roll cage extending over the seating area. The vehicle may include a door hinged to the vehicle body and releasably engaged to the vehicle body in a closed position by a latch. The vehicle may include a net extending above the door to the roll cage, wherein the net is releasably attached to the roll cage by a clip actuatable by a cable connected to the latch.

In another aspect, the disclosure provides a method of operating a vehicle door including a door portion hinged to a vehicle body and a net portion extending above the door portion to a roll cage of the vehicle. The method may include attaching a clip connected to the net portion to the roll cage, wherein the clip is actuatable by a cable connected to a latch of the door portion. The method may include operating a handle of the door to both release the latch of the door portion and to actuate the clip to release the clip from the roll cage.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

FIG. 3 is diagram of an example clip in a closed position, according to an aspect of the disclosure.

FIG. 4 is a diagram of the example clip of FIG. 3 in an open position, according to an aspect of the disclosure.

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to any manned or unmanned structure capable of moving and is powered by any form of energy. The term "vehicle" includes, but is not limited to: cars, trucks, vans, minivans, SUVs, motorcycles, scooters, boats, personal watercraft, submersibles, aircraft, and spacecraft. In some cases, a motor vehicle includes one or more engines.

It should be understood that the description and drawings herein are merely illustrative and that various modifications and changes can be made in the structures disclosed without departing from the present disclosure. In general, the figures of the example vehicle roof structure are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the example vehicle door system disclosed herein are merely terms of art that may vary from one manufacturer to another and should not be deemed to limit the present disclosure.

Generally described, the present disclosure provides for a door system for a vehicle including a rigid door portion and a flexible net portion. The rigid door portion may be hinged to a body of the vehicle. The flexible net portion may be attached to a roll cage of the vehicle at various locations. When the door system is closed, the rigid door portion may be held in position by a latch and the flexible net portion may be pulled taut by the attachment at various locations.

A user of the vehicle (e.g., a driver or passenger) may want to quickly exit the vehicle. Conventional door systems including a flexible net portion and a door portion typically require two separate actions to open the rigid door portion and to detach the net portion. According to the present disclosure, the flexible net portion may be attached to the roll cage at least one location via a clip that is actuatable by the latch of the rigid door portion. Accordingly, when the user opens the rigid door portion, the clip attaching the flexible net portion to the roll cage may also be released, allowing the user to easily exit the vehicle.

Figure 1:
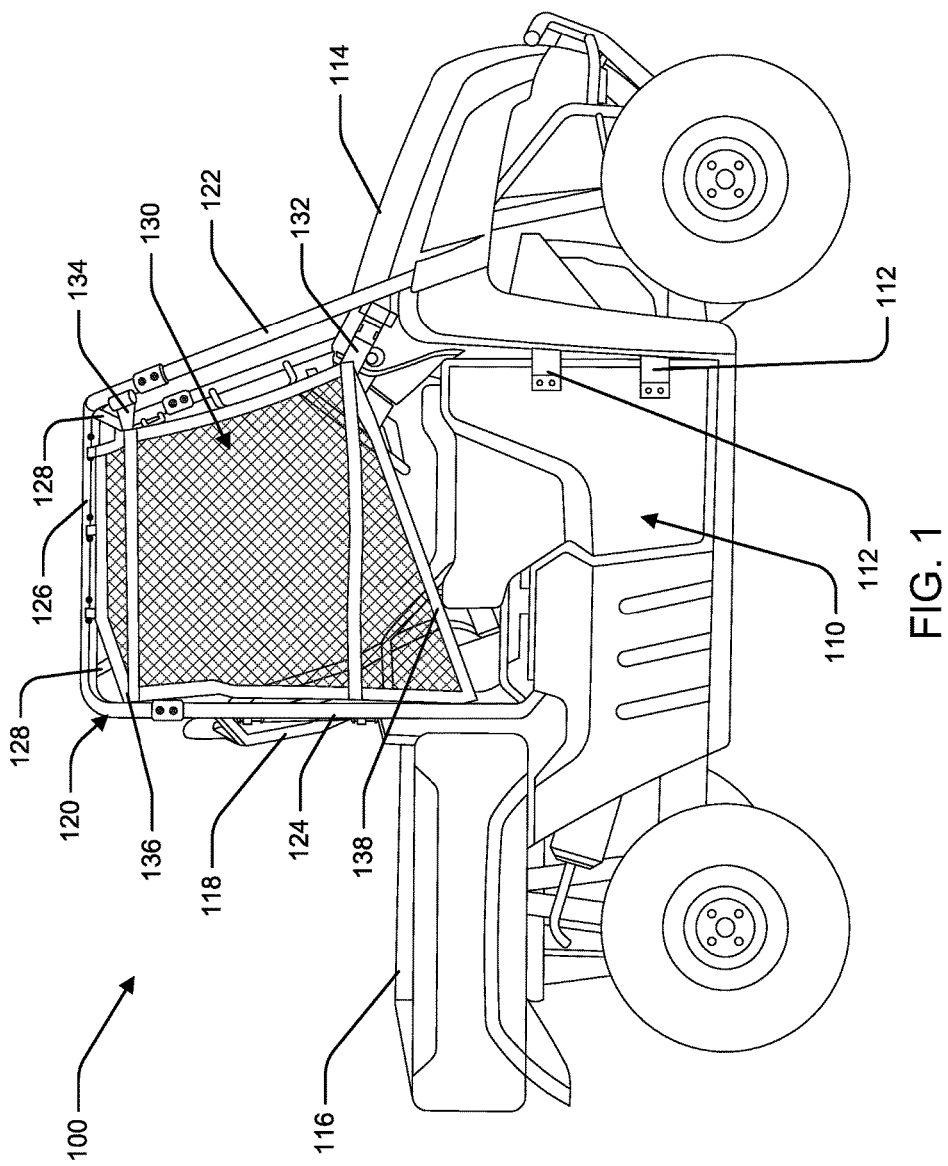
FIG. 1 is a side view of an example multi-use vehicle having a rigid door and a flexible net.

Turning to the figures, where like reference numbers refer to like components, FIG. 1 illustrates an example multi-use vehicle 100 including a rigid door portion 110 and a flexible net portion 130 attached to a roll cage 120. Although an example multi-use vehicle is illustrated, it should be appreciated that the door system described herein may be applied to other vehicles. In particular, the door system may be suitable for vehicles having an open frame structure such as a roll cage, roll-over protection, or occupant protection system. For simplicity, an open structure extending above a body of a vehicle will be interchangeably referred to herein as a roll cage.

For example, the vehicle 100 may include a body 114 that includes a hood and extends to the dashboard of the vehicle 100. The vehicle 100 may also include a cargo area 116 located behind a seat 118. The roll cage 120 may extend above the body 114 and cargo area 116 to protect a user sitting on the seat 118. For example, the roll cage 120 may include front vertically extending members 122, rear vertically extending members 124, top longitudinal members 126 and top lateral members 128.

The rigid door 110 may be mounted to the vehicle body 114 via hinges 112. For example, two vertically spaced hinges may be attached to the front edge of the door and to a door frame portion of the body 114. The rigid door 110 may be rigid relative to the flexible net portion 130. The rigid door 110 may include a metal frame structure covered by one or more panels, which may be formed, for example, from metal or plastic. The rigid door 110 may include a latch, located opposite the hinges 112 that secures the rigid door 110 in a closed position within the door frame. The latch may be a handle, which may be located on an inside surface of the rigid door 110. As discussed in further detail below, the latch may be coupled to a clip attaching the net portion 130 to the roll cage 120 such that actuation of the latch also actuates the clip.

The flexible net portion 130 may be a porous barrier that extends across a side opening in the roll cage 120 above the rigid door 110. The flexible net portion 130 may be flexible relative to the rigid door 110. The flexible net portion 130 may be formed by fibers (natural or synthetic) woven in a grid-like structure. The flexible net portion 130 may also include straps located around a perimeter of the net. The straps may include various detachable connectors (e.g., clips, hooks, loops) for attaching the flexible net portion 130 to the roll cage 120. For example, the flexible net portion 130 may be attached at lower front attachment point 132, upper front attachment point 134, upper rear attachment point 136 and door attachment point 138. In an aspect, the detachable connectors may be manually detached at any of the attachment points 132, 134, 136, 138. For example, the detachable connectors at all of the attachment points may be released to completely remove the flexible net portion 130. In order to facilitate a user exiting the vehicle 100, the top rear attachment point 136 may be connected using a clip that is actuatable by the door latch. The door attachment point 138 may attach the flexible net portion 130 to the rear edge of the rigid door 110 such that when the rigid door 110 is opened, the lower portion of the flexible net portion 130 moves with the rigid door 110. Accordingly, when the upper rear attachment point 136 is automatically released with the door latch, the rear edge of the flexible net portion 130 may be detached from the rear vertically extending member 124, thereby allowing the flexible net portion 130 to open with the rigid door 110 and allowing the user to exit the vehicle 100.

Figure 2:
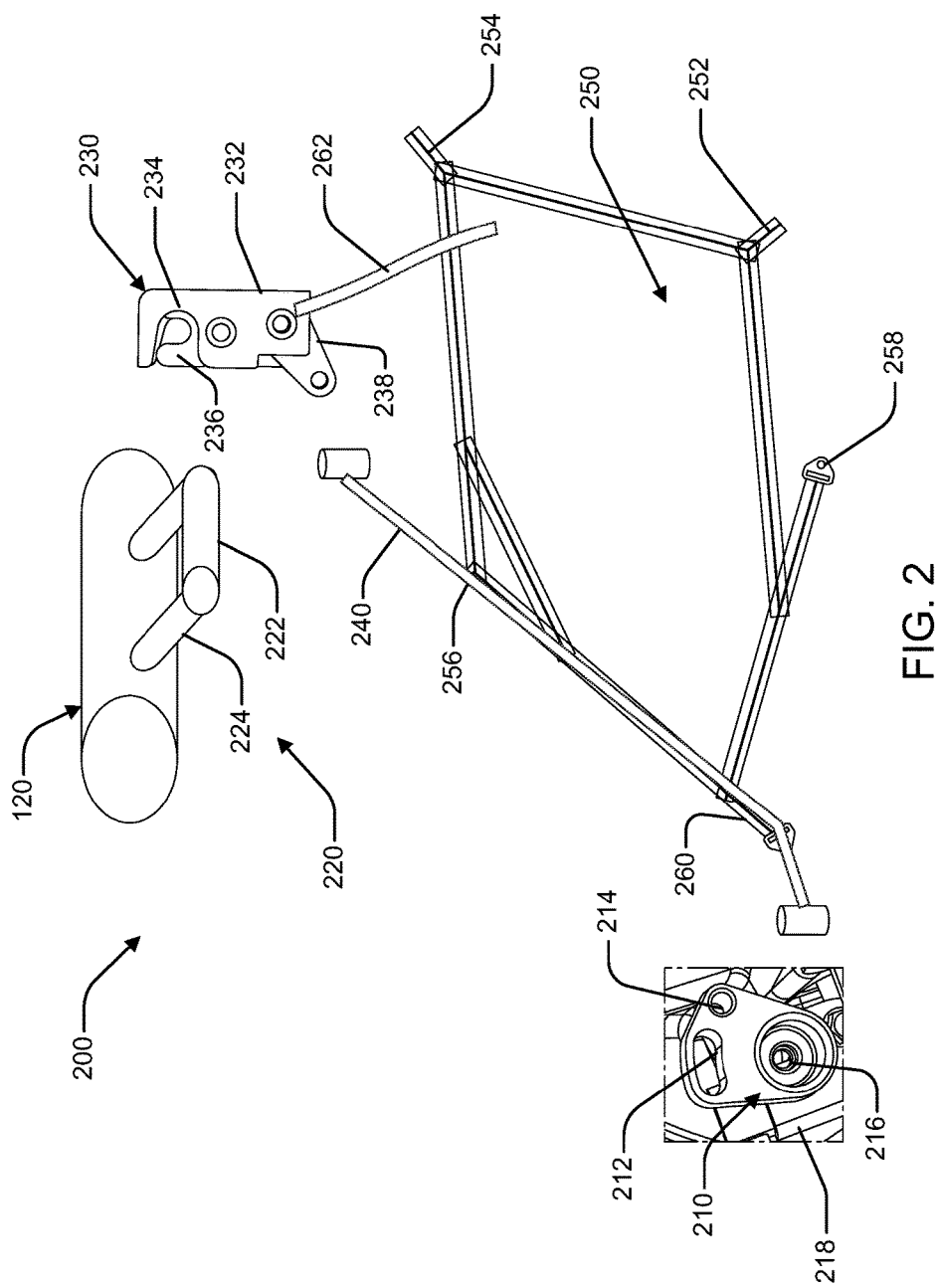
FIG. 2 is a conceptual diagram of an example door and net coupling system, according to an aspect of the disclosure.

FIG. 2 illustrates further details of an example door and net coupling system 200, which may be used to attach a flexible net portion 130 to a roll cage 120 and a rigid door 110. The door and net coupling system 200 may include a door latch 210, a roll cage bracket 220, a clip 230, a cable 240, and a flexible net 250. The clip 230 may releasably attach to the roll cage bracket 220 and be actuatable by the latch 210 via the cable 240 to release the clip 230 from the roll cage bracket 220.

The latch 210 may be a latch that retains the rigid door 110 within the door frame of the vehicle body 114. The latch 210 may be rotatably mounted to a structural door member 218 via an opening 216, which may retain a pin (not shown). The latch 210 may also include an opening 212 for attaching to a door handle and an opening 214 for attaching to the cable 240. It should be appreciated that although one type of latch 210 is shown, other types of latches known in the art may be suitable. For example, the door and net coupling system 200 may be actuated by a latch that experiences translational or rotational movement when releasing the rigid door 110.

The roll cage bracket 220 may be a feature of the roll cage 120 that allows attachment of the clip 230. For example, as illustrated the roll cage bracket 220 may include a bar 222 spaced from the roll cage 120 by extensions 224. It should be appreciated that other types of brackets may be suitable. For example, a metal ring or loop may form the roll cage bracket 220. In an aspect, the clip 230 may be directly attached to the roll cage 120 (e.g., at a narrow section or through an opening in a roll cage member).

The clip 230 may releasably connect the flexible net 250 to the roll cage bracket 220. The clip 230 may include an outer housing 232 having a notch 234 that receives the bar 222. A first inner member 236 may be rotatably mounted in the housing 232. The first inner member 236 may include a notch that receives the bar 222 and retains the bar 222 within the notch 234 when the first inner member is oriented substantially perpendicular to the notch 234. A second inner member 238 may be rotatably mounted in the housing 232. The second inner member 238 may include a leg that connects to the cable 240. The first inner member 236 and the second inner member 238 may include corresponding engagement features that prevent the first inner member 236 from rotating when the engagement features are engaged. The engagement features may be released when the cable 240 pulls on the leg of the second inner member 238.

The cable 240 may connect the latch 210 to the clip 230. For example, the cable 240 may connect to the latch 210 at the opening 212 and connect to the clip 230 at the second inner member 238. Movement of the latch 210 may be translated to movement of the second inner member 238 to release the clip 230. In an aspect, the cable 240 may be a coaxial cable having an outer load bearing lumen and an inner actuation cable. The outer loadbearing cable may be attached to the outer housing 232 and the inner cable may be attached to the second inner member 238. The cable 240 may be enveloped by the flexible net 250. For example, the cable 240 may be sewn into a rear strap of the flexible net 250. Accordingly, the cable 240 may pull the flexible net 250 taut when the clip 230 is attached to the roll cage 120.

The flexible net 250 may be similar to the flexible net portion 130. That is, the flexible net 250 may include a porous barrier formed by fibers woven in a grid-like structure and straps located a perimeter of the porous barrier. The straps may be a load-bearing portion of the flexible net 250 and may include releasable connectors for connection to the roll cage 120 and the rigid door 110. For example, the flexible net 250 may include a lower front connector 252, a top front connector 254, a top rear connector 256, a middle door connector 258, and a rear door connector 260. The top rear connector 256 may be the clip 230 or may connect to the clip 230.

The clip 230 may be attached to the flexible net 250 in various ways. In an aspect, the cable 240 may connect the flexible net 250 to the clip 230. For example, the cable 240 may be a coaxial cable having an outer load bearing lumen and an inner actuation cable. The outer load bearing cable may be attached to the outer housing 232 and the inner cable may be attached to the second inner member 238. In another aspect, the clip 230 may be attached to a top strap of the flexible net 250. Additionally, the clip 230 may be attached to the flexible net 250 by an elastic member 262. The elastic member 262 may be connected to the flexible net 250 at a forward location of the flexible net 250, for example, the top front connector 254. The elastic member 262 may pull the clip 230 forward when the clip 230 is detached from the roll cage bracket 220.

FIG. 3 shows the example clip 230 in a closed position. Example outlines of the first inner member 236 and the second inner member 238 within the housing 232 are illustrated with dashed lines. The first inner member 236 may include, e.g., a first prong 310 and a second prong 312 defining a notch 314 there between. Opposite the notch 314, the first inner member 236 may include, e.g., an engagement feature 316. In the illustrated example, the engagement feature 316 may be a notch. The second inner member 238 may include a leg 320. The leg 320 may include an opening 322 that may receive the cable 240. The second inner member 238 may also include, e.g., engagement feature 324, which may correspond to the engagement feature 316. For example, as illustrated, the engagement feature 324 may be a protrusion sized to correspond to the notch of engagement feature 316.

The clip 230 may be attached to the bar 222 by placing the bar 222 into the notch 314 and rotating the first inner member 236 clockwise. For example, when pressing the clip against the bar 222, the bar 222 may exert force on the prong 312 causing the first inner member 236 to rotate clockwise. The prong 310 may close the notch 234 preventing the bar 222 from exiting the notch 234. The second inner member 238 may be rotated clockwise such that the engagement feature 324 engages the engagement feature 316. For example, the first inner member 236 may be biased to rotate clockwise or may be manually rotated.

FIG. 4 is a diagram of the example clip 230 of FIG. 3 in an open position. The clip 230 may be opened by rotating the second inner member 238 counterclockwise, as illustrated. For example, the cable 240 may pull the leg 320 in a downward direction 330 to rotate the second inner member 238 counterclockwise. The engagement feature 324 may rotate out of engagement with the engagement feature 316, freeing the first inner member 236 to rotate counterclockwise. The first inner member 236 may rotate such that the notch 314 at least partially aligns with the notch 234 allowing the bar 222 to pass out of the notch 314. The clip 230 may also be manually opened by pulling the leg 320 in the downward direction 330.

Figure 5:
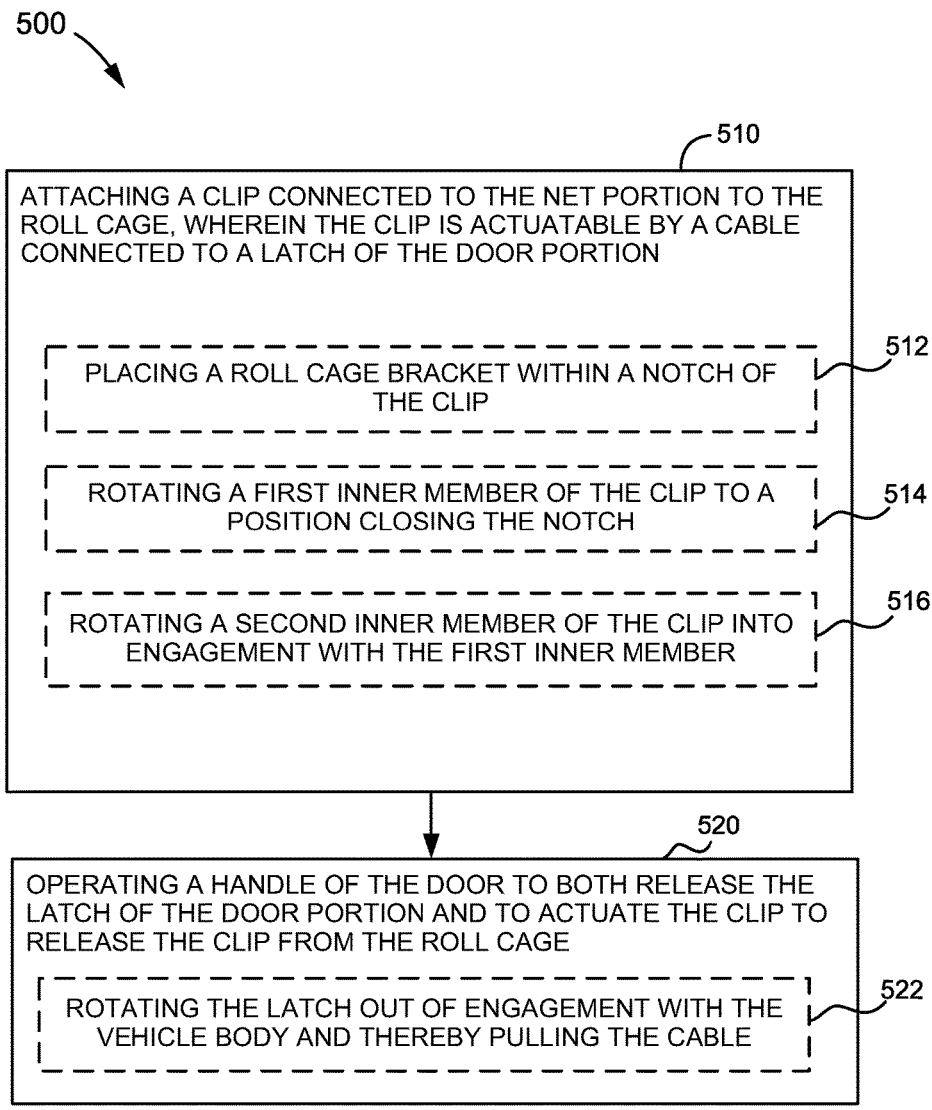
FIG. 5 is a flowchart of an example method for operating a vehicle door, according to an aspect of the disclosure.

FIG. 5 is a flowchart illustrating an example method 500 of operating a vehicle door. For example, the vehicle door may include the door and net coupling system 200. The method 500 may be performed by a user of the vehicle such as either a driver or a passenger.

In block 510, the method 500 may include attaching a clip to the roll cage, wherein the clip couples the net portion to the roll cage, and wherein the clip is actuatable by a cable connected to a latch of the door portion. In an aspect for example, the user may attach the clip 230, which is connected to the net 250, to the roll cage 120 (e.g., via roll cage bracket 220) thereby coupling the net 250 to the roll cage 120. The clip 230 may be actuatable by the cable 240 connected to the latch 210 of the door 110.

In block 512, the block 510 may optionally include placing a roll cage bracket within a notch of the clip. For example, the user may place the roll cage bracket 220 within the notch 234 of the clip 230.

In block 514, the block 510 may optionally include rotating a first inner member of the clip to a position closing the notch. For example, the user may rotate the first inner member 236 of the clip 230 to a position (e.g., illustrated in FIG. 3) closing the notch 234.

In block 516, the block 510 may optionally include rotating a second inner member of the clip into engagement with the first inner member. For example, the user may rotate the second inner member 238 into engagement with the first inner member 236. In another aspect, the second inner member 238 may be biased (e.g., by a spring) to rotate into engagement with the first inner member.

In block 520, the method 500 may include operating a handle of the door to both release the latch of the door portion and to actuate the clip to release the clip from the roll cage. For example, the user may operate the handle of the door 110 to both release the latch 210 of the door 110 and to actuate the clip 230 to release the clip 230 from the roll cage 120.

In block 522, the block 520 may optionally include rotating the latch out of engagement with the vehicle body and thereby pulling the cable. For example, the user may rotate the latch 21- out of engagement with the vehicle body 114 by pulling the handle. As the latch 210 rotates, the latch 210 may pull the cable 240, thereby actuating the clip 230. The user may open the door 110 once the latch is rotated and the clip 230 is released from the roll cage 120.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A door system for a vehicle having a roll cage, comprising:
    a door hinged to a vehicle body and releasably engaged to the vehicle body in a closed position by a latch; and
    a net extending from the door to the roll cage, wherein the net is releasably attached to the roll cage by a clip actuatable by a cable connected to the latch.

2. The door system of claim 1, wherein the clip includes an outer housing having a notch that receives a bar attached to the roll cage, a first inner member rotatable within the outer housing to retain the bar within the notch, and a second inner member coupled to the cable and rotatable within the outer housing to engage the first inner member.

3. The door system of claim 2, wherein the first inner member and the second inner member include corresponding engagement features that prevent the first inner member from rotating when the corresponding engagement features are engaged.

4. The door system of claim 2, wherein the cable, when pulled, disengages the second member from the first member and allows the first member to rotate away from the notch to free the bar.

5. The door system of claim 2, wherein the cable is a coaxial cable including an outer lumen and an inner cable that slides relative to the outer lumen in an axial direction, wherein the inner cable is coupled to the second inner member.

6. The door system of claim 5, wherein the outer lumen is coupled to the outer housing.

7. The door system of claim 1, wherein the cable is enveloped within the net.

8. The door system of claim 1, wherein the net includes a woven grid structure and a plurality of straps surrounding the woven grid structure.

9. The door system of claim 1, wherein the door comprises a handle coupled to the latch, wherein pulling the handle rotates the latch.

10. The door system of claim 1, further comprising an elastic member connecting the clip to a forward location on the net.

11. The door system of claim 1, wherein the clip couples a top rear corner of the net to a top rear corner of the roll cage.

12. A vehicle, comprising:
a vehicle body including a seating area;
a roll cage extending over the seating area;
a door hinged to the vehicle body and releasably engaged to the vehicle body in a closed position by a latch; and
a net extending from the door to the roll cage, wherein the net is releasably attached to the roll cage by a clip actuatable by a cable connected to the latch.

13. The vehicle of claim 12, wherein the clip includes:
an outer housing having a notch that receives a bar attached to the roll cage;
a first inner member rotatable within the outer housing to retain the bar within the notch; and
a second inner member coupled to the cable and rotatable within the outer housing to engage the first inner member.

14. The vehicle of claim 13, wherein the first inner member and the second inner member include corresponding engagement features that prevent the first inner member from rotating when the corresponding engagement features are engaged.

15. The vehicle of claim 13, wherein the cable is a coaxial cable including an outer lumen and an inner cable that slides relative to the outer lumen in an axial direction, wherein the inner cable is coupled to the second inner member and the outer lumen is coupled to the outer housing.

16. The vehicle of claim 12, wherein the clip couples a top rear corner of the net to a top rear corner of the roll cage, the vehicle further comprising an elastic member connecting the clip to a forward location on the net.

17. A method of operating a vehicle door including a door portion hinged to a vehicle body and a net portion extending from the door portion to a roll cage of the vehicle, the method comprising:
attaching a clip to the roll cage, wherein the clip couples the net portion to the roll cage, and wherein the clip is actuatable by a cable connected to a latch of the door portion; and
operating a handle of the door to both release the latch of the door portion and to actuate the clip to release the clip from the roll cage.

18. The method of claim 17, wherein operating the handle comprises rotating the latch out of engagement with the vehicle body and thereby pulling the cable.

19. The method of claim 18, wherein attaching the clip connected to the net portion to the roll cage comprises:
placing a roll cage bracket within a notch of the clip;
rotating a first inner member of the clip to a position closing the notch; and
rotating a second inner member of the clip into engagement with the first inner member.

20. The method of claim 19, wherein pulling the cable rotates the second inner member out of engagement with the first inner member of the clip to release the roll cage bracket.

\* \* \* \* \*